United States Patent [19]

Van den Ende

[11] Patent Number: 4,703,809
[45] Date of Patent: Nov. 3, 1987

[54] APPARATUS FOR SOIL WORKING
[75] Inventor: Anthony Van den Ende, Lewedorp, Netherlands
[73] Assignee: 501 Vandenende B.V. Borssele, Netherlands
[21] Appl. No.: 826,028
[22] Filed: Feb. 4, 1986
[30] Foreign Application Priority Data Feb. 12, 1985 [NL] Netherlands ................ 8500396

[51] Int. Cl.$^4$ .................. A01B 21/04; A01B 35/18
[52] U.S. Cl. ................................ 172/147; 172/151; 172/520; 172/504
[58] Field of Search ............. 172/520, 147, 148, 149, 172/150, 153, 151, 15, 71, 72, 68, 530, 157, 145, 173, 172

[56]  References Cited
U.S. PATENT DOCUMENTS

| 876,951 | 1/1908 | Dollison | 172/148 |
| 4,091,878 | 5/1978 | Steketee | 172/520 |
| 4,537,262 | 8/1985 | Van der Lely | 172/520 |

FOREIGN PATENT DOCUMENTS

| 2043416 | 10/1980 | United Kingdom | 172/129 |
| 2117212 | 10/1983 | United Kingdom | 172/271 |

OTHER PUBLICATIONS

Power Farming Update, 6-1985, the SKH Crumbler.
Power Farming, vol. 64, No. 8, p. 20, 8-1985, Kombi--Cult Advertisment.

Primary Examiner—Richard J. Johnson
Attorney, Agent, or Firm—John P. Snyder

[57] ABSTRACT

An apparatus for soil working, consisting of a frame (1) drawn over the ground by a vehicle, a first roller (7) mounted rotatably in the frame (1), extending transversely to the travelling direction, a second rotatably supported roller (19) arranged parallel to and behind the first roller (7) and driven thereby through a transmission (17), and two or more rows of soil working members (6) fixed to the frame, wherein the first roller (7) extends between two rows of soil working members (6), and is mounted adjustably in height an securably with respect to the frame (1), the second roller (19) being coupled either to the frame (1) or to the first roller (7) by two or more vertically moveable swing arms (20), so effectuating a precise pressure on the ground of the first (1) or alternatively the second roller (19) independently of one another, and also by maintaining an exact setting of the soil working members (6) at a specific level.

19 Claims, 4 Drawing Figures

APPARATUS FOR SOIL WORKING

The invention concerns an apparatus for soil working, consisting of a frame drawn over the ground by a vehicle, a first roller mounted rotatably in the frame, extending transversely to the travelling direction, a second rotatably supported roller arranged parallel to and behind the first roller and driven thereby through a transmission, and two or more rows of soil working member fixed to the frame.

A soil working apparatus of the above kind is used for preparing ground such as seed-beds, and/or for weed control. The frame is hereby drawn over the land, so that the first roller rolls on the ground as a result of this towing motion. Through the transmission, and depending on the selected transmission ratio, the rear roller will acquire a different speed from the first roller, such that the soil will be crumbled and levelled. The pin-like soil working members serve hereby to first break the ground.

The invention has for its aim to improve the above described apparatus by effectuating a precise pressure on the ground of the first or alternatively the second roller, independently of one another, and also by maintaining an exact setting of the soil working members at a specific level.

The apparatus according to the invention is distinguished in that the first roller extends between two rows of soil working members, and is mounted adjustably in height and securably with respect to the frame, the second roller being coupled either to the frame or to the first roller by two or more vertically moveable swing arms.

By this means, the second roller can be adjusted in height relative to the first roller, whereby the respective ground pressures of the first and second rollers are so controlled that slippage of the first roller does not occur, while the clod-breaking operation of the second roller is optimized.

Since the first roller is mounted between the two rows of soil working members, and only this roller carries the frame, a system of adjustment by tilting with respect to the axis of rotation of the first roller is possible, whereby the depth adjustment of the soil working members can be accurately regulated. The second roller will automatically adapt to the adjusted position.

In one embodiment, the pivot of each swing arm is fitted coincident with the rotation axis of the first roller, whereby the transmission can be simply embodied, for example by means of a chain.

According another characteristic of the invention, the axis of the first roller lies in, or nearly in, the centre between the two rows of soil working members. Hereby, it is easier to achieve the required maintenance of equal depth of the soil working organs respectively before, and behind, the roller.

The above mentioned and other characteristics will be further explained in the description of the drawings, below, of two embodiments.

Figure 3:
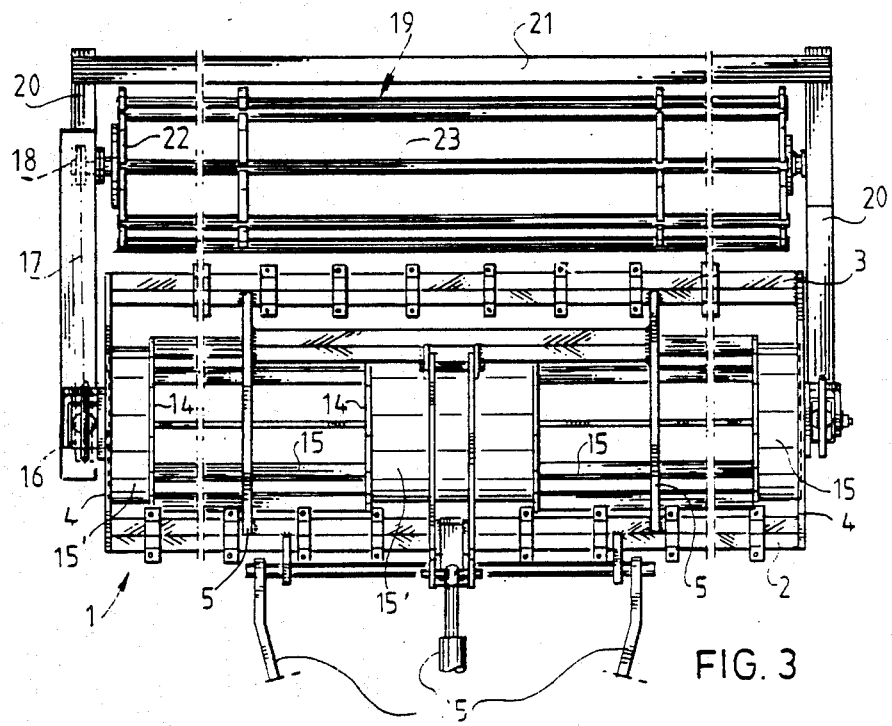

The apparatus shown in the drawings consists principally of a frame, 1, constructed of section members such that, viewed from above, a chiefly rectangular frame is obtained (see FIG. 3). The frame consists of front cross-member 2, and rear cross-member 3 running parallel thereto which is connected by longitudinal members 4 and intermediate members 5. Intermediate members 5 have an arched shape.

On front and rear beams 2 and 3 there is a number of soil working members 6 adjacently fitted, such that two parallel rows are formed.

Between these rows of soil working members 6, there extends roller 7 which is rotatably supported by more or less aligned shafts 8, bushes for shafts 8 being secured in vertical members 9. Section members 9 are telescopically slidable in a vertical direction in guidance sections 10, which are fastened, for example, by means of bolts, to the outside of the longitudinal sections.

Figure 1:
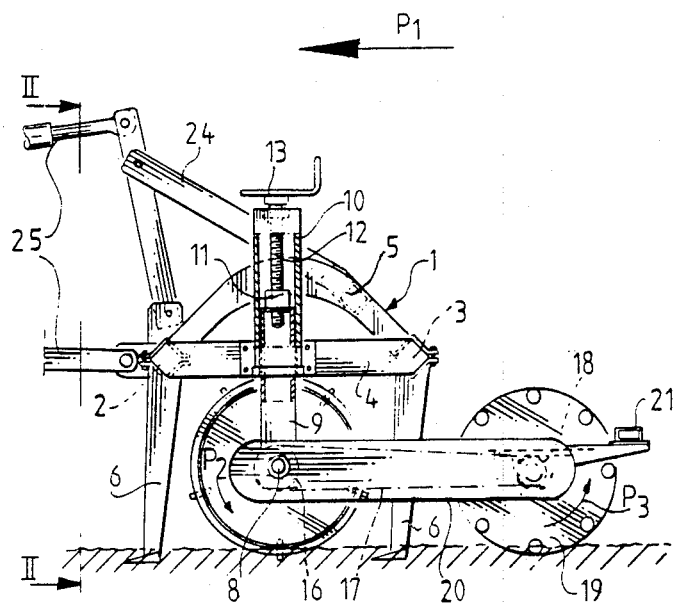
FIG. 1 shows a side elevation of a first embodiment of the apparatus according to the invention.

The top of each member 9 has fixed thereto a nut 11 in which a lead screw 12 operates, the lead screw being rotatably supported in the top of member 10. The top of lead screw 12 is equipped with a handle 13. Using this construction, which is located on each side of the frame, first roller 7 is adjustable in height with respect to the frame between soil working members 6. The adjustment throw is so large that intermediate members 5 extending above roller 7 have an arched shape (see FIG. 1) in order to ensure that in the lowest position of the frame with respect to the ground, there is sufficient room in the frame for roller 7.

Figure 2:
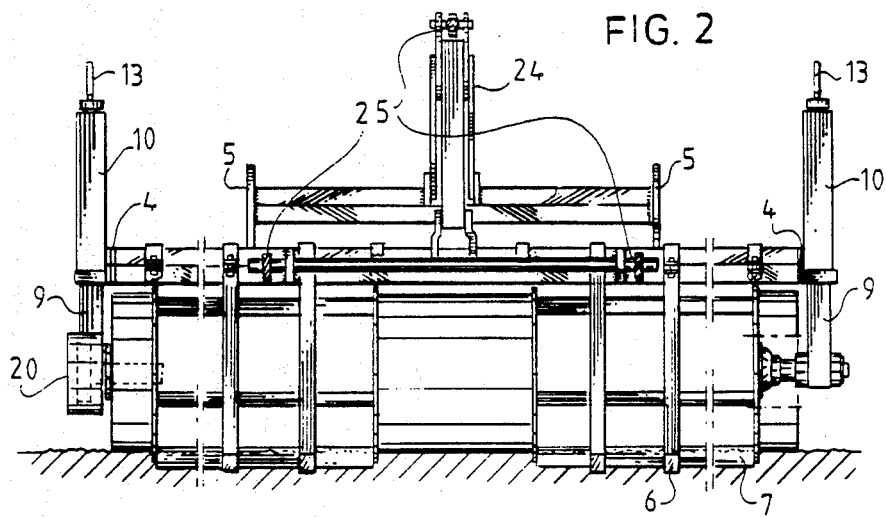
FIGS. 2 and 3 show front and top elevations, respectively, of the apparatus of FIG. 1.

Roller 7 can be of any required shape. The roller consists principally of a number of plates 14, arranged perpendicular to the rotation axis, the plates serving to support bars 15, which make contact with the ground. Bars 15 may extend over the full length of the roller, or may be constructed of parts of such bars, as can be seen in figures 2 and 3. Preferably, bars 15 are staggered with respect to one another, or alternatively they are twisted helically around the rotation axis, in order to effectuate a regular motion of roller 7 over the ground. Adjacent to plates 14, and outside bars 15, there are fitted closed substantially cylindrical drums 15', which prevent sinking into ruts.

On one of the two sides of roller 7 there is fastened to shaft 8 a sprocket, 16, over which chain 17 passes, the chain being guided to a sprocket 18 of roller 19, to be described further below.

The second roller, 19, is freely rotatably journalled in vertically moveable swing arms 20, one of which, the left swing arm in FIGS. 2 and 3, is at the same time embodied as a chain casing for transmission 16, 17, 18. The forward ends of arms 20 are pivoted about the shafts 8 of the forward roller whereby the pivot axis of swing arms 20 therefore coincides with the rotation axis of front roller 7, so that upwards or downwards movement of the swing arms does not result in a change of distance between sprockets 16 and 18, so that the tension on chain 17 is maintained in all positions. The arms are connected together at the rear by cross member 21, which serves for guarding roller 19 and/or for the fitting of extra levelling means such as sprung tines.

The construction of roller 19 can be carried out in any required way, and further falls outside the scope of the invention. This roller also consists of a number of vertical plates 22 which are connected at their circumference by bars 23, which have a form such that a regular motion of the roller and an effective clod-breaking action is obtained.

The transmission ratio, dependent on the pitch diameters of sprockets 16 and 18, is such that the circumferential velocity of rear roller 19 differs from that of front roller 7. In the embodiment shown, the circumferential velocity of the rear roller will be higher. It should be mentioned, for completeness, that frame 1 can be coupled, by means of harness 24 to the three-point lifting apparatus 25 of an agricultural tractor (not shown).

The above described apparatus works as follows: To set the required grubbing depth in the soil of the soil working members 6, it is sufficient to turn the two handles 13 on either side of the apparatus in such a way that the desired height of roller 7 is obtained with respect to frame 1. The three-point lifting apparatus is then so adjusted that longitudinal beam 4 is horizontal, which means, given an equal length of soil working members 6, that an equal depth is automatically achieved for both sides, without the rear roller 19 being influenced with respect to its position.

On the apparatus being towed over the ground in the direction of arrow P1, roller 7 will start turning in the direction of arrow P2 as a consequence of the resistance from the ground which this roller encounters. Through this rolling, sprocket 16 is brought into rotation and, through chain 17, also sprocket 18. Sprocket 18 then turns roller 19 in the direction of arrow P3. As said, the circumferential velocity of rear roller 19 is higher, so that bars 23 move over the surface at a higher speed than the speed of progression in the direction of arrow P1, whereby clods which are raised can be broken up.

Thanks to the free swivelling motion of the rear roller by means of swing arms 20, the pressure on the ground of the rear roller 20 is determined only by its own weight, or alternatively that of the frame formed by swing arms 20 and cross-member 21. Because of this construction, the rear roller can always easily follow irregularities in the surface, irrespective of the setting of frame 1 behind the tractor. Thus ground contact is always maintained with a definite pressure.

Figure 4:
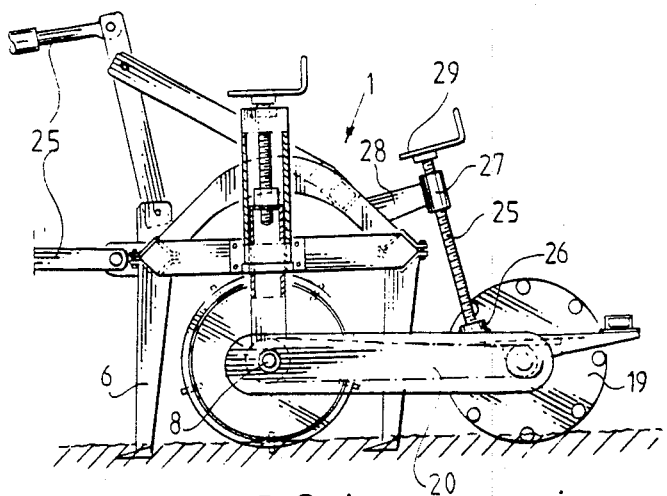
FIG. 4 shows a side elevation, corresponding to FIG. 1, of a second embodiment.

For some applications it may be desirable to fix the angle of swing arms 20 with respect to frame 1, which is possible in the alternative embodiment in FIG. 4 by means of lead screw 25. The lead screw is rotatably but axially unslidably accommodated in pot 26, which is fastened to arm 20. Lead screw 25 cooperates with screwed sleeve 27, which is fastened to arm 28 of frame 1. By the turning of handle 29, arm 20 can therefore be pivoted vertically and can be fastened in a selected position.

The setting of this apparatus works correspondingly to the apparatus described above, except in that after the correct horizontal adjustment of frame 1 or of soil working organs 6, the ground pressure of rear roller 19 can be adjusted by the turning of lead screw 25.

As an alternative to this embodiment, the lead screw can be replaced by springs, hydraulic cylinders etc. by the use of which the ground pressure of the rear roller can be arbitrarily adjusted.

The invention is not restricted to the embodiments described above.

I claim:

1. Apparatus for working soil comprising a frame to be drawn longitudinally over the ground by a vehicle, a first roller rotatably mounted in the frame about a transverse axis and a second roller parallel with the first roller and disposed behind the first roller, a pair of vertically swingable swing arms having the forward ends thereof pivotally supported about said axis, the rearward ends thereof rotatably supporting said second roller, transmission means for driving the second roller from the first roller, a pair of rows of soil working members carried by the frame and disposed in fore and aft relation to each other with the first roller disposed therebetween, and means for adjustably securing the height of the first roller with respect to the frame.

2. An apparatus as claimed in claim 1, characterized in that the rotation axis of the first roller is, or is nearly, positioned in the centre between the two rows of soil working members.

3. An apparatus as defined in claim 2 wherein each swing arm is secured in predetermined position with respect to the frame.

4. An apparatus as defined in claim 2 wherein the first roller is formed by bars extending substantially perpendicular to the travelling direction and which are supported by at least one substantially cylindrical part.

5. An apparatus as claimed in claim 1 characterized in that each swing arm is securable in a determined position wth respect to the frame.

6. An apparatus as defined in claim 5 wherein the first roller is formed by bars extending substantially perpendicular to the travelling direction and which are supported by at least one substantially cylindrical part.

7. An apparatus as claimed in claim 1 characterized in that the first roller is formed by bars extending substantially perpendicular to the travelling direction, which bars are supported by one or more substantially cylindrical parts.

8. An apparatus as claimed in claim 7, characterized in that the bar is equipped with a raised strip which is positioned projectingly or radially with respect to the direction of rotation.

9. An apparatus as claimed in claim 7, characterized in that two or more substantially cylindrical parts fitted remotely from one another are mutually connected by bars.

10. An apparatus as defined in claim 9 wherein the bar is equipped with a raised strip which is projected with respect to the direction of rotation.

11. An apparatus as defined in claim 1 wherein the rotation axis of the first axis is positioned substantially in the center between the two rows of soil working members.

12. An apparatus as defined in claim 1 wherein each swing arm is secured in predetermined position with respect to the frame.

13. An apparatus as defined in claim 1 wherein the first roller is formed by bars extending substantially perpendicular to the travelling direction and which are supported by at least one substantially cylindrical part.

14. Apparatus for soil working comprising a frame adapted to be drawn longitudinally over the ground by a vehicle, a forward transverse row of soil working members depending from the frame and a rearward transverse row of soil working members depending from the frame and defining an open space therebetween, a transversely elongate forward roller disposed in the open space between the forward and rearward transverse rows of soil working members, the forward roller having a transverse axis of rotation and stub axles coaxial with such axis at the opposite ends of the forward roller, the forward roller including ground-engaging substantially cylindrical portions in the center and adjacent the opposite ends thereof which function as ground supports for the frame, adjustable means connecting the frame with the stub axles of the forward roller for vertically guiding the frame with respect to the forward roller so as to support the frame at a desired elevation above the ground surface with corresponding variable penetration of the soil working members into the ground, a transversely elongate rearward roller disposed behind the rearward row of soil working members, the rearward roller having an axis of rotation and stub axles coaxial with such axis at the opposite ends of the rearward roller, the rearward roller substantially only comprising circumferentially spaced ground-penetrating elements, a pair of trailing swing arms at opposite sides of the frame and a transverse member rigidly connecting the swing arms adjacent their trailing ends, the forward ends of the swing arms pivotally receiving the stub axles of the forward roller and trailing portions of the swing arms rotatably receiving the stub axles of the rearward roller so that the swing arms with the rearward roller may swing vertically about the axis of the forward roller in unison, and transmission means connecting the stub axles of the forward roller to the stub axles of the rearward roller for driving the rearward roller at a different circumferential speed than the circumferential speed of the forward roller.

15. Apparatus as defined in claim 14 wherein the frame is of generally open, rectangular plan view form presenting fore and aft transverse frame members and longitudinal opposite side frame members, the forward transverse row of soil working members depending from the forward transverse frame member and the rearward transverse row of soil working members depending from the rearward transverse frame member, the stub axles of the forward roller being in generally underlying relation to respective longitudinal opposite side frame members, the forward roller including ground-penetrating elements in the regions between the substantially cylindrical portions, the adjustable means connecting the transverse opposite side members of the frame with the stub axles of the forward roller for vertical travel of the frame relative to the forward roller, and the transmission means driving the rearward roller at a greater circumferential speed than the circumferential speed of the forward roller.

16. Apparatus as defined in claim 15 including means adjustably connecting the frame with the swing arms for swinging the rearward roller to adjusted positions about the axis of the forward roller.

17. Apparatus as defined in claim 14 including means adjustably connecting the frame with the swing arms for swinging the rearward roller to adjusted positions about the axis of the forward roller.

18. Apparatus for working soil comprising a frame to be drawn longitudinally over the ground by a vehicle, a pair of rows of soil working members rigidly carried by the frame and disposed in fore and aft spaced relation to each other to define an open space therebetween, a first roller disposed in said open space and having a transverse axis of rotation disposed between said pair of rows, means for supporting the frame relative to the ground through the axis of rotation of the first roller and including vertical guide mechanism guiding the first roller between the rows vertically with respect to the frame so that the rows of soil working members are tiltably adjustable at opposite ends of the first roller to adjust the depth of said members relative to the ground, a pair of vertically swingable swing arms having leading ends pivotally coupled to the first roller coincidental with its axis of rotation, a second roller disposed behind the aft row of soil working members and rotatably mounted between the trailing ends of the swing arms about an axis of rotation parallel with the axis of rotation of the first roller, and transmission means for driving the second roller from the first roller.

19. Apparatus as defined in claim 18 wherein the axis of rotation of the first roller and the guide mechanism are located substantially mid way between the fore and aft rows of soil working members.

* * * * *